June 17, 1924.

D. H. TUCK

PHOTOMETRIC MEASURING INSTRUMENT

Filed Nov. 4, 1919

Witnesses:

Inventor
Davis H. Tuck.
By his Attorney Joel B. Liberman.

Patented June 17, 1924.

1,498,214

UNITED STATES PATENT OFFICE.

DAVIS H. TUCK, OF LEONIA, NEW JERSEY, ASSIGNOR TO HOLOPHANE GLASS COMPANY, INC., OF NEW YORK, N. Y., A CORPORATION OF NEW JERSEY.

PHOTOMETRIC MEASURING INSTRUMENT.

Application filed November 4, 1919. Serial No. 335,684.

*To all whom it may concern:*

Be it known that I, DAVIS H. TUCK, a citizen of the United States, and a resident of the town of Leonia, county of Bergen, and State of New Jersey, have invented certain new and useful Improvements in Photometric Measuring Instruments, of which the following is a specification.

The object of the invention is to construct an instrument which will measure the intensity of light on both horizontal and vertical planes, as well as the surface brightness of any object and the candle power of any object. The advantages of the present invention over instruments of this character lie in its wide range of use, portability, and certain new construction of photometric screens. First, it has two distinct types of photometric screens, one of which is for use when accurate measurements are desired and the other when approximate measurements are desired. It requires some experience to make photometric measurements with the photometric screen in the photometer head, while no experience is required to make photometric measurements with the photometric screen located on the side of the photometer. Second, it is entirely self-contained in that it contains the two photometric elements, the standardized lamp, the battery, the rheostat, and the current measuring device and switch all in one. The rheostat, current measuring device and electric switch are directly connected both mechanically and electrically and one may operate the other. The instrument is constructed to operate on a modified principle of the law of inverse squares. Third, it has a range of 10,000 units which is sufficient to measure light intensities varying between a fraction of full moonlight to full sunlight. Fourth, it has a simple and accurate photometric screen in the photometric head made of a total reflecting prism with a light transmitting area or of clear glass silvered over a portion of its surface. Fifth, it has an entirely new photometric screen located on the side of the photometer constructed as hereafter described and washable so that it may be cleaned when soiled.

Figure 1:
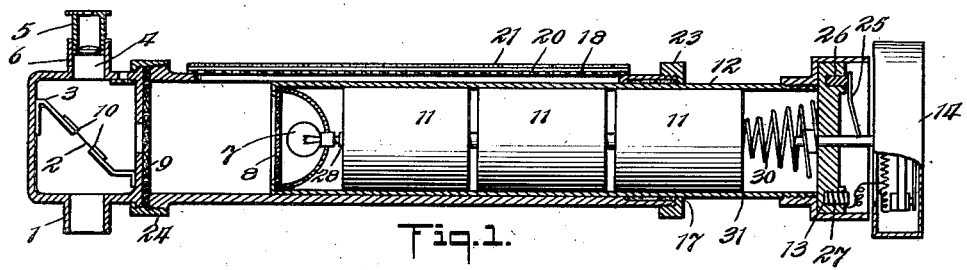
Figure 1 is a side elevation of a device partly in section constructed according to my invention.
Figure 2:
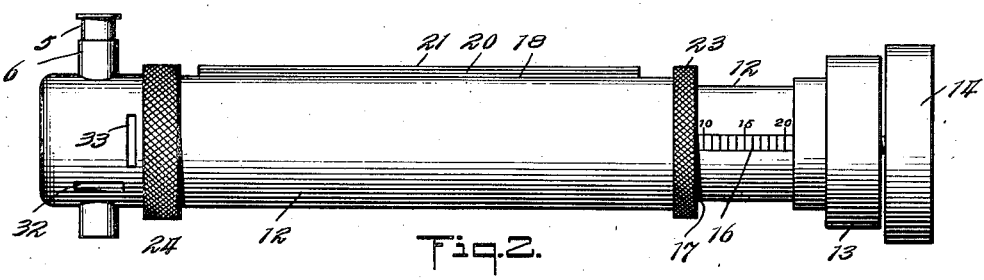
Figure 2 is a perspective view of the same.

The various parts are best described in the method of employment of the device which is as follows:

To measure light intensity on or the brightness of any object, the tube 1, is pointed perpendicularly to the surface to be measured and the light reflected from this surface passes through tube to the spot 2, on the photometric screen 3, through the telescope 4, consisting of the sliding portion 5 and the holding tube 6, to the eye of the observer. Light from the standard lamp 7, passes through the translucent glass screen 8 to the translucent screen 9, to the silvered surface 10 of the photometric screen 3 and is reflected through telescope 4 to the eye of the observer. The standardized lamp 7 is maintained at a constant candle power by current from the dry battery 11 in the sliding tube 12 which current is controlled by the rheostat 13 and observed by the ammeter 14. The brightness of the transparent spot 2 and the silvered spot 10 of the photometric screen 3 due to light entering at opening 1 and the light transmitted by translucent screen 9 is made to become equal by running the sliding tube 12 in or out of the stationary tube 15. The actual brightness of the observed surface as compared with that of the translucent screen 9 illuminated from the standard lamp 8 is read off in units from a scale 16 marked on sliding tube 12 with the edge 17 of stationary tube 15 as an index.

Figure 7:
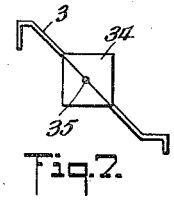
Figure 7 is an elevation of a modification of the photometric screen.
Figures 4, 5:
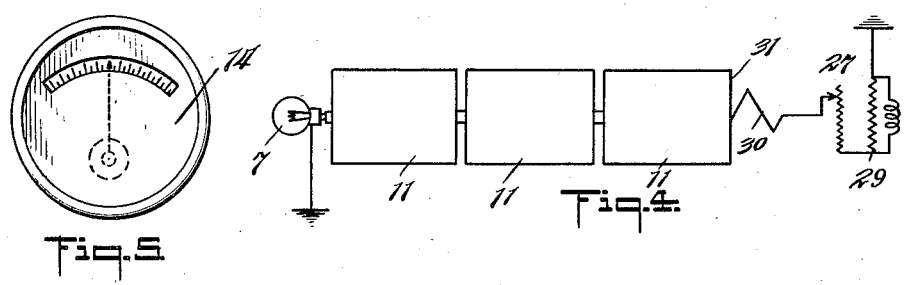
Figure 4 is a wiring diagram showing electrical connections of my apparatus.
Figure 5 is a view of the current measuring instrument scale used in my device.

Figure 7 shows an elevation of a modification of the photometric screen in which the total reflecting element is a cube 34 composed of two equilateral prisms the faces of which form 90° angles. In the center of the two contacting faces, a small bit of Canada balsam 35 is placed. This destroys the total reflecting qualities of the prism at that point so that a beam of light can pass through the cube at this point.

Figure 3:
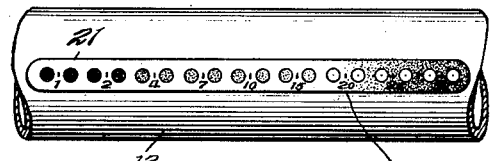
Figure 3 is a perspective view showing the location and construction of the side photometric screen.
Figure 6:
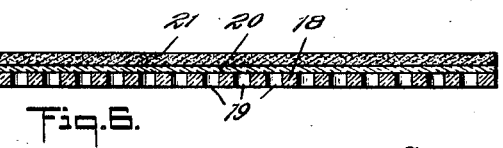
Figure 6 is a side elevation of the photometric screen located on the side of the instrument constructed in the manner hereinafter set forth.

Figure 1 also shows the instrument adapted to measure the light intensity on or near any objects by means of photometric screen 18 on the side of the instrument. The movable tube 12 is moved out of the stationary tube 15 to the limit of its travel. The standard lamp 7 now illuminates the translucent screen 8 which in turn illuminates the white opaque screen 18. (See enlarged vertical cross section of the side photometric screen shown in Fig. 6.) Holes 19 cut in the opaque screen 18 allow the light from translucent screen 8 to illuminate the translucent screen 20 and this light passes through glass translucent screen 21. The translucent screen 21 is also illuminated by the light falling on it from the source whose intensity it is desired to measure. The appearance of the translucent screen 21 is now as shown in Fig. 3 having a series of spots illuminated to a greater intensity than the spaces forming the frame of the screen spots toward the right or near the standard lamp 7, and to a lesser intensity than the surrounding frame when to the left or away from the standard lamp 7. The spot which is of the same brightness as its surrounding is the one which indicates the scale reading 22. The translucent screen 21 being made of glass can be washed when soiled without changing its light reflecting and transmitting qualities.

The instrument is taken apart by removing nut 23 so that renewal batteries 11 can be inserted in sliding tube 12. The instrument also comes apart by removing nut 24 so that adjustment can be made to photometer screen 3 and translucent screen 9, and standard lamp 7.

To cause electric current to flow through lamp 7, ammeter 14 is turned about its axis and causes metal contact 25 to move from insulator 26 on to the rheostat winding 27. The path of the electric current is then from the positive pole of the battery 28 through the lamp 7 to metal tube 12; from metal tube 12 to ammeter shunt, from ammeter shunt to metal contact 25, from metal contact to rheostat winding 27, from rheostat winding to spring contact 30, from spring contact to the negative pole of the battery 31.

In order to increase the range of the instrument over the scale marked on sliding tube 12 neutral tinted glass absorbing screens are placed in slots 32 or 33. By placing neutral tinted screen in slot 33 the apparent brightness of the translucent screen 19 is reduced by a known factor. By placing neutral tint screen in slot 32 the apparent brightness of the observed surface is reduced by a known factor. Screens similar in shape to neutral tint screens but of varying colors may be placed in slots 32 or 33 so as to cause the color of the observed surface to match color of the standard lamp 7.

It will be readily observed that the various elements in the photometer are such that it can be assembled in compact form not much larger than the ordinary pocket flash light.

It will be observed that the electrical connection between the lamp, current supply, rheostat and ammeter is made without the use of wire or soldered connection.

Having described my invention what I claim is:—

1. A portable instrument for measuring light comprising a casing, a standard lamp, photometric means of coordination with the lamp for photometric observation, a current supply device consisting of a battery and a current measuring and control device, the battery being mounted in a tube sliding in the casing and the tube being provided with a scale to record photometric measurements by adjustment thereof in the casing.

2. A current measuring and control device for portable photometers comprising an integral current measuring device, rheostat and switch mounted in a single casing having contacts in relation to other contacts adapted to automatically make the proper connection with the battery and lamp of the photometer without the use of wires.

3. A portable instrument for measuring light, comprising a casing, a standard lamp, photometric means of coordination with the lamp for photometric observation, a battery, and a current measuring and control device comprising an integral current measuring device, rheostat and switch mounted in a single casing having contacts in relation to other contacts adapted to automatically make the proper connection with the battery and lamp without the use of wires, the battery being mounted in a tube sliding in the casing, such tube being provided with a scale adapted to record photometric measurements by adjustment thereof in the casing.

In testimony whereof I hereunto affix my signature this 30th day of October 1919.

DAVIS H. TUCK.